United States Patent Office 3,391,162
Patented July 2, 1968

3,391,162
ETHYLENE AND PROPYLENE KETALS OF SUBSTITUTED MERCAPTOCYCLOHEXANONES
Harold M. Foster, Middlesex, and Roger P. Napier, Edison, N.J., assignors to Mobil Oil Corporation, a corporation of New York
No Drawing. Filed Dec. 20, 1965, Ser. No. 515,250
4 Claims. (Cl. 260—340.9)

This invention relates to substituted mercaptocyclohexanones. It is more particularly concerned with novel ethylene and propylene ketals of certain mercaptocyclohexanones.

The compounds of this invention are ethylene and propylene ketals of 3-mercaptocyclohexanones, as more fully described hereinafter. These compounds are valuable intermediates in the synthesis of 4-hydroxybenzothiophenes. The latter are converted into benzothienyl carbamates, an effective class of pesticides, as fully disclosed in copending application Ser. No. 487,333, filed Sept. 14, 1965, now Patent No. 3,288,673, a continuation-in-part of copending application Ser. No. 427,089, filed Jan. 21, 1965, now Patent No. 3,288,808, a continuation-in-part of copending application Ser. No. 334,581, filed Dec. 30, 1963, now abandoned, a continuation-in-part of application Ser. No. 220,073, filed Aug. 28, 1962, now abandoned.

In order to prepare the 4-hydroxybenzothiophenes, the compounds of this invention are subjected to hydrolysis and ring closure, using strong mineral acid catalysts, to produce partly saturated 4-ketobenzothiophenes. A method generally applicable for effecting this ring closure is illustrated in copending application Ser. No. 515,199, filed concurrently herewith. The partly saturated 4-ketobenzothiophenes are then converted to the 4-hydroxybenzothiophenes by liquid or vapor phase dehydrogenation. Typical procedures for effecting such dehydrogenation are described in copending applications Ser. No. 455,604, filed May 13, 1965, now Patent No. 3,345,382; Ser. No. 458,771, filed May 21, 1965, now Patent No. 3,317,552; and Ser. No. 468,094, filed June 29, 1965, now Patent No. 3,335,152.

Accordingly, it is a broad object of this invention to provide a novel class of ethylene and propylene ketals of substituted cyclohexanones. Another object is to provide novel ethylene and propylene ketals of substituted mercaptocyclohexanones. A specific object is to provide novel ethylene and propylene ketals of functionally substituted 3-mercaptocyclohexanones. Other objects and advantages of this invention will become apparent to those skilled in the art, from the following detailed description.

In general, this invention provides compounds having the formula:

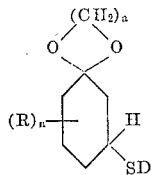

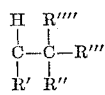

wherein $a$ is 2 or 3; $n$ is 0 to 3; R is alkyl $(C_1-C_8)$, alkenyl $(C_2-C_8)$, alkoxy $(C_1-C_4)$, alkylthio $(C_1-C_4)$, amino, alkylamino $(C_1-C_8)$, di$(C_1-C_4)$alkylamino, or cyano; D is hydrogen, acetyl, or wherein R', R'', R''', and R'''' are hydrogen, halogen, alkoxy $(C_1-C_8)$, hydroxyl, mercapto, alkylmercapto $(C_1-C_8)$, alkyl $(C_1-C_8)$, alkenyl $(C_2-C_8)$, amino, alkylamino $(C_1-C_8)$, or dialkylamino $(C_1-C_8)$, or R''' and R'''' together are a bivalent group selected from =O, =S, —OCH$_2$CH$_2$O—, —OCH$_2$CH$_2$CH$_2$O—,

—SCH$_2$CH$_2$O—

—SCH$_2$CH$_2$S—, —SCH$_2$CH$_2$CH$_2$O—, and

—SCH$_2$CH$_2$CH$_2$S—

Compounds of this invention that are particularly useful as intermediates for preparing 4-hydroxybenzothiophene are those having the formula:

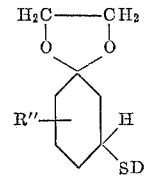

wherein D is hydrogen, acetyl, or

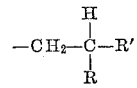

wherein R is hydrogen, halogen, or alkoxy $(C_1-C_8)$; R' is alkoxy $(C_1-C_8)$, halogen, or acetoxy; and R'' is hydrogen, alkyl $(C_1-C_8)$, or alkenyl $(C_2-C_8)$.

The compounds of this invention can be prepared by several methods, but the particular method of synthesis used is not a pertinent factor or feature of this invention. Indeed, any method that will produce the compounds of this invention can be employed. The ketal formation can be an initial step of the synthesis or it can the final step. The ketal is formed by reacting ethylene glycol or propylene glycol with a 3-substituted cyclohexanone, in the presence of an acid catalyst, such as p-toluene sulfonic acid. Water is formed during the reaction and provision should be made for its removal to drive the reaction to completion. A suitable method is to carry out the ketal formation in a non-polar solvent, such as benzene, toluene, or xylene, at reflux temperature to remove water by azeotropic distillation.

One method for making the compounds of this invention involves initially forming a functionally substituted 3-ethyl-mercaptocyclohexanone by reacting a 2-mercaptoethyl derivative having a functional group or groups, such as 2-mercaptoethyl acetate or thiolacetic acid, with 2-cyclo-hexen - 1 - one, by adding the mercapto group across the double bond. Generally, such addition is effected at temperatures ranging from ambient temperatures up to about 100° C., with or without the use of catalysts. This method is disclosed and illustrated in copending application Ser. No. 515,252, filed concurrently herewith, to which reference is made. The substituted cyclohexanone is then converted to the ethylene ketal or propylene ketal, as aforedescribed.

Another method for the synthesis of the substituted cyclohexanones is also described in Ser. No. 515,252. It involves the reaction between 3-mercaptocyclohexanone and an olefinic compound containing the functional group or groups. The 3-mercaptocyclohexanone is readily prepared by the addition of hydrogen sulfide across the double bond of 2-cyclohexen-1-one. Again, the substituted cyclohexanone is then converted to the ethylene or propylene ketal.

Alternatively, the order of the above methods can be reversed. Thus, one can first form the ethylene ketal or propylene ketal of 2-cyclohexen-1-one or of 3-mercaptocyclohexanone and then react them, in place of 2-cyclohexen-1-one or 3-mercaptocyclohexanone, in the addition reactions described in Ser. No. 515,252.

Non-limiting examples of typical compounds of this invention are the ethylene ketals and the propylene ketals of 3-mercaptocyclohexanone;
of 3-acetylmercaptocyclohexanone;
of 3-(2,2-diethoxyethylmercapto)cyclohexanone;
of 3-(2,2-dimethoxyethylmercapto)-5-ethylcyclohexanone;
of 3-(2,2-dioctoxyethylmercapto)cyclohexanone;
of 3-(2-acetoxyethylmercapto)-4-hexenylcyclohexanone;
of 3-(2-bromoethylmercapto)cyclohexanone;
of 3-(2-chloroethylmercapto)cyclohexanone;
of 3-(2-acetoxyethylmercapto)-4-methylcyclohexanone;
of 3-(2-ethoxyethylmercapto)cyclohexanone;
of 3-(2,2-dimethoxyethylmercapto)cyclohexanone;
of 3-mercapto-4-methylcyclohexanone;
of 3-(2,2-dimethoxyethylmercapto)-5-octylcyclohexanone, and
of 3-(2,2-dimethoxyethylmercapto)-6-propenylcyclohexanone.

Example 1

To 28.8 g. of 2-cyclohexen-1-one was added 22.8 g. of thiolacetic acid with good stirring. A fairly violent exotherm occurred and the reaction mixture became yellow in color. Stirring was continued for 45 minutes and then the reaction mixture was permitted to stand overnight. The reaction product was dissolved in diethyl ether (100 ml.). The resultant ether solution was washed twice with 50 ml. portions of a saturated aqueous solution of sodium bicarbonate and dried over anhydrous calcium sulfate. Removal of the ether left 46.8 g. of oil 3-acetylmercaptocyclohexanone.

A mixture of 20.7 g. 3-acetylmercaptocyclohexanone, 10.7 g. of ethylene glycol, 1.5 g. of p-toluenesulfonic acid, and 200 ml. of benzene was heated under reflux with provision for azeotropic removal of water by means of a Dean-Stark apparatus. After one hour and 15 minutes, the formation of water had ceased. The reaction mixture was cooled and poured into an equal volume of 10% aqueous solution of sodium carbonate. The resultant mixture was extracted with diethyl ether. The ether extract solution was dried over anhydrous calcium sulfate. The ether was evaporated from the dried extract leaving a residual oil, the ethylene ketal of 3-acetylmercaptocyclohexanone.

Example 2

A mixture of 10 g. of the ethylene ketal of 3-acetylmercaptocyclohexanone (Example 1) and 125 ml. of 10% aqueous solution of sodium carbonate was heated to 75° C. with vigorous stirring. Then, 15 ml. of methanol was added to improve solubility. The mixture was subsequently heated to 92° C. and held at that temperature, with vigorous stirring for 1.5 hours. The reaction mixture was cooled and extracted with three 75 ml. portions of diethyl ether. The combined ether extracts were dried over anhydrous calcium sulfate. The ether was evaporated to yield 7.9 g. of crude ethylene ketal of 3-mercaptocyclohexanone. This was purified by distillation under reduced pressure to yield a fraction boiling at 66.5° C. at 0.82 mm. mercury pressure. It had a $n_D^{20}$ of 1.5069 and by vapor phase chromatography was over 99% pure. The nuclear magnetic resonance and infrared spectra were in excellent accord with the proposed structure, ethylene ketal of 3-mercaptocyclohexanone.

Example 3

Hydrogen sulfide was bubbled through a solution of 10 g. 2-cyclohexen-1-one, 250 ml. of benzene, and 0.5 ml. of triethylamine for 12 hours. Analysis by vapor phase chromatography showed 70% conversion to 3-mercaptocyclohexanone. To this reaction solution was added 20 ml. of ethylene glycol and 2 g. of p-toluene sulfonic acid. The reaction mixture was heated at reflux for 1.5 hours with removal of water by means of a Dean-Stark apparatus. The reaction mixture was cooled and poured into 100 ml. of 10% aqueous sodium hydroxide solution. The caustic phase was separated, washed with benzene, chilled in an ice bath, and then carefully neutralized with hydrochloric acid. The oil which separated was extracted with diethyl ether and the ether solution was dried over magnesium sulfate. The ether was then removed by distillation. The oily product amounted to 10.1 g. and was 98% pure by vapor phase chromatographic analysis. The infrared spectrum was identical with that of the product of Example 2, i.e., the ethylene ketal of 3-mercaptocyclohexanone.

Example 4

A solution of 8.8 g. of ethylene ketal of 3-mercaptocyclohexanone, 6.2 g. of dimethyl chloroacetal, 2.2 g. of sodium hydroxide, and 50 ml. of methanol was heated under reflux with stirring for about 8 hours. The progress of the reaction was followed by neutralizing samples of the reaction mixture and examining the organic phase by vapor phase chromatographic analysis. The disappearance of both starting materials and the appearance of the product were clearly evident as the reaction proceeded. At the end of the 8 hour heating period 0.5 g. of sodium iodide and 0.2 g. of sodium hydroxide were added and heating was continued for an additional 6 hours. At that time vapor phase chromatographic analysis indicated complete disappearance of both starting materials and the formation of the product, the ethylene ketal of 3-(2,2-dimethoxyethylmercapto)cyclohexanone.

In the foregoing examples, typical compounds of this invention have been illustrated and characterized. As those skilled in the art will readily recognize, substituted derivatives can be made readily. For example, in place of 2-cyclohexen-1-one or the ethylene ketal of 3-mercaptocyclohexanone reactant, a ring-substituted derivative can be used. Also, the compounds, such as those of the examples, can be further substituted by methods well known in the art, including bromination and chlorination of the carbocyclic ring.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A compound having the formula:

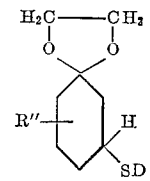

wherein D is selected from the group consisting of hydrogen, acetyl, and

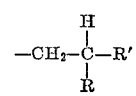

wherein R is selected from the group consisting of hydrogen, halogen, and alkoxy ($C_1$–$C_8$), R' is selected from the group consisting of alkoxy ($C_1$–$C_8$), halogen, and acetoxy; and R'' is selected from the group consisting of hydrogen, alkyl ($C_1$–$C_8$), and alkenyl ($C_2$–$C_8$).

2. The compound defined in claim 1, wherein D is acetyl and R'' is hydrogen.

3. The compound defined in claim 1, wherein D and R″ are hydrogen.
4. The compound defined in claim 1, wherein D is
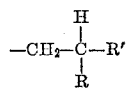
R and R′ are methoxy, and R″ is hydrogen.
References Cited
UNITED STATES PATENTS
3,288,808  11/1966  Kilsheimer et al. ___ 260—330.5
3,345,382  10/1967  Kremer _____ 260—330.5
NICHOLAS S. RIZZO, *Primary Examiner.*
J. H. TURNIPSEED, *Assistant Examiner.*